June 2, 1970    F. H. DAVIDSON ET AL    3,514,864
EXTENSOMETER

Filed Sept. 27, 1967    3 Sheets-Sheet 1

FREDRICK H. DAVIDSON
ALBERT B. CURTIS, JR.
IVER D. CAYOCCA
INVENTORS

BY Edward O. Ansell
Taylor M. Belt

ATTORNEYS

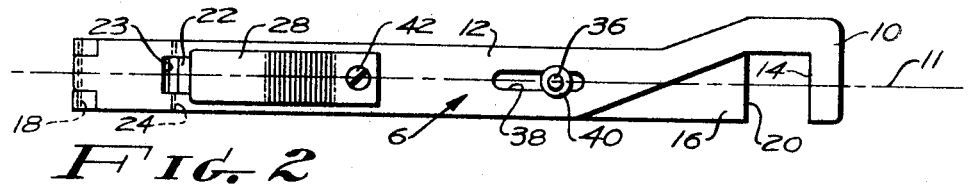
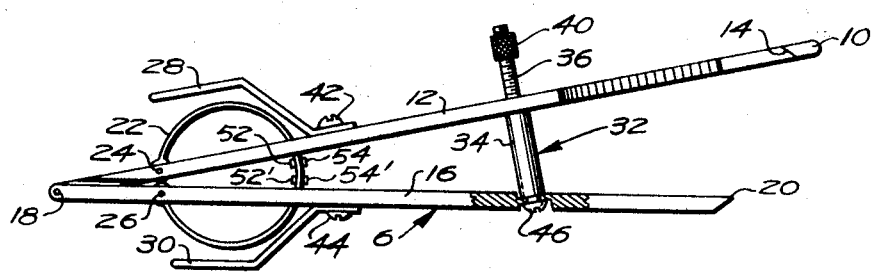
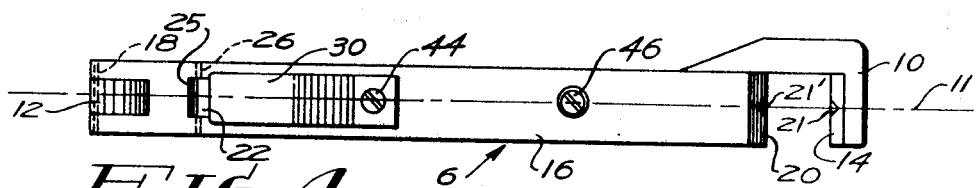
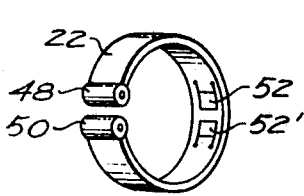
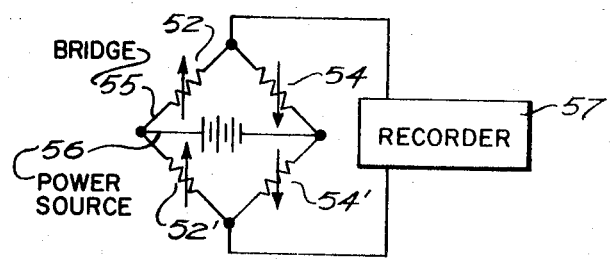
FREDRICK H. DAVIDSON
ALBERT B. CURTIS, JR.
IVER D. CAYOCCA
EDWARD O. ANSELL
INVENTORS
BY Taylor M. Belt
ATTORNEYS

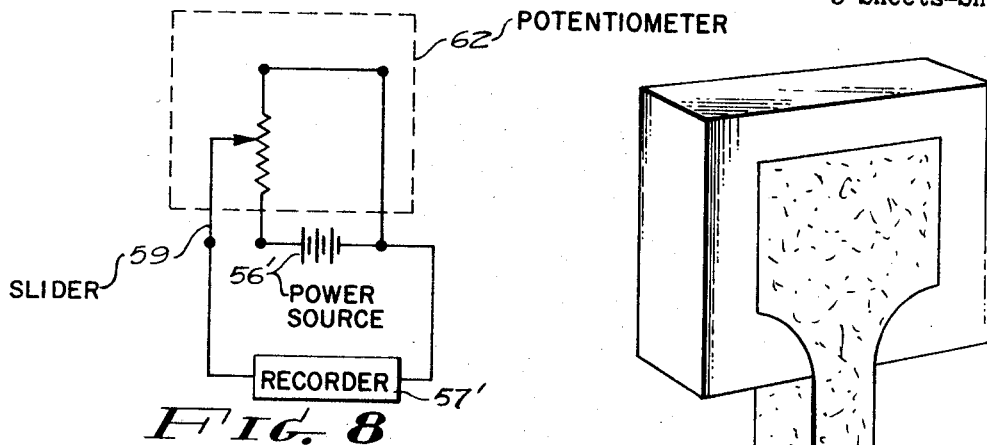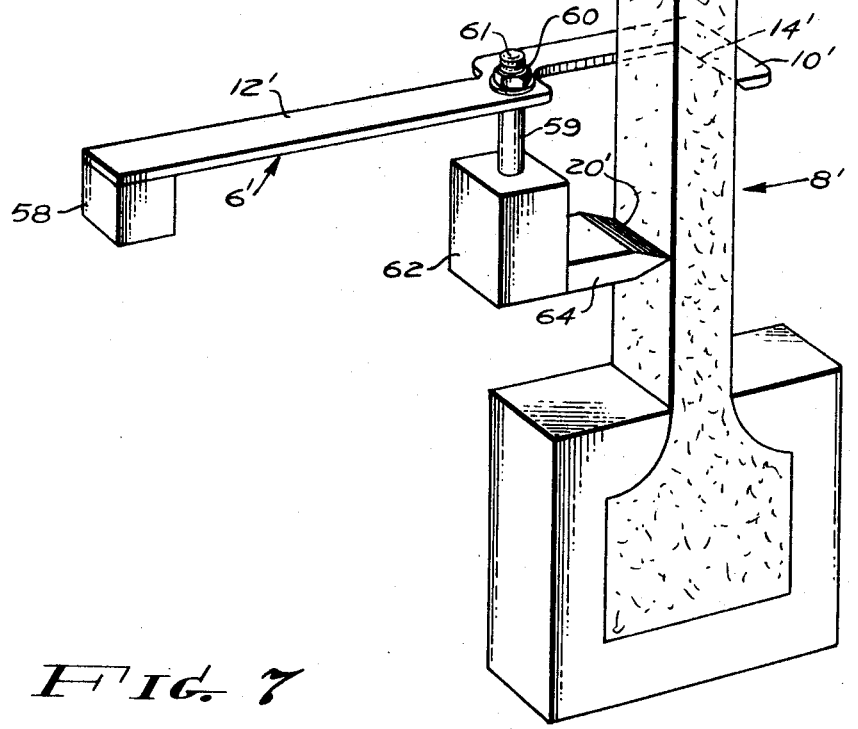

United States Patent Office 3,514,864
Patented June 2, 1970

3,514,864
EXTENSOMETER
Frederick H. Davidson, Albert B. Curtis, Jr., and Iver D. Cayocca, Sacramento, Calif., assignors to Aerojet-General Corporation, El Monte, Calif., a corporation of Ohio
Filed Sept. 27, 1967, Ser. No. 671,073
Int. Cl. G01b 5/00
U.S. Cl. 33—148                                 11 Claims

ABSTRACT OF THE DISCLOSURE

An extensometer apparatus is comprised of a lower arm having a knife-edge on one end thereof, which edge rests against one side of a test specimen and an upper, elongated arm having an offset hook on one end thereof with a knife-edge that also rests against the test specimen on another side opposite the side upon which the lower arm rests. The upper and lower arms are in operable association with each other such that a change in elongation of the test specimen results in a change in the distance between the two knife edges, which changes are in direct relationship to each other. A measuring device, such as a linear potentiometer, is in operable association with the lower and upper arms for measuring changes in distance between the two knife edges.

BACKGROUND OF THE INVENTION

Field of the invention

This invention relates to instrumentation apparatus to make continuous recordable linear extension measurement of the uniaxial test specimen being deformed.

Description of the prior art

The problem of obtaining accurate modulus and strain data, particularly in the art of elastomers, is well known by those familiar with the field. For example, a test specimen is assumed to have a given constant gage length and the strain is defined as the change in length divided by the gage length, that is, the change divided by the original length. Strain force is that force applied to a test specimen which causes any change in length. In reality, the gage length often changes during the course of a test due to slippage and flow of the tab ends in the tester jaws. This change in gage length causes the test data to be subject to considerable error.

Heretofore, various techniques have been developed to obtain accurate test data. For example, strain gages may be attached to the test specimen or opical measuremen techniques may be utilized. The use of strain gages normally requires advance preparation by clamping or otherwise attaching the strain gages to the test sample. The use of optical methods have proven to be inaccurate or complicated and in most cases intermittent, requiring time consuming data reduction.

Although, when employing prior art techniques test data is obtained, the accuracy of such data is often subject to question. Consequently, the modulus and strain data must be used with the knowledge that it is subject to considerable error, or in lieu thereof, a complicated and time consuming test must be performed.

OBJECTS AND SUMMARY OF THE INVENTION

Accordingly, it is a primary object of this invention to provide a new measurement apparatus for accurate measurement of true elongation.

Another object of this invention is to provide a measurement apparatus that measures the elongation of that area of interest of the test specimen.

A further object of this invention is to provide an elongation measurement apparatus that is accurate, though uncomplicated and easy to use, and one which can readily be employed in the determination of true strain.

Still a further object of this invention is to provide a measurement apparatus that does not require clamping or special set up of the test instrument.

Additional objects and advantages of the invention will be manifest to those skilled in the art when referring to the accompanying drawings.

These and other objects of this invention are accomplished by having an upper arm and a lower member operably interconnected. The lower member has a knife edge that rests against one side of a test specimen. The upper arm has on one end thereof, an offset hook with a knife edge facing the upper arm and which knife edge is normal to and across the upper arm. The knife edge on the upper arm also rests against a side of the test specimen, though on another side opposite that upon which the lower member rests. A measuring means, for example, a linear potentiometer, is connected between the upper arm and lower arm to measure any changes in distance between the arms. By use of this invention an accurate gage length may be obtained which is the initial distance between the knife edges and an accurate change in length is obtained through the measuring means. Calculations based upon an accurate gage length and accurately measured changes in length during test will result in accurate modulus and strain data.

The novel features that are considered characteristic of this invention are with particularity set forth in the appended claims. The invention will best be understood when the following description is read in connection with the accompanying drawings.

BRIEF DESCRIPTION OF THE DRAWINGS

The drawings appended to this application are as follows:

FIG. 2 is a top view of the embodiment illustrated in FIG. 1 showing the relationship of the various structural parts;

FIG. 3 is a side view of the embodiment illustrated in FIG. 1 showing the relationship of the various structural parts and particularly the limiting stop;

FIG. 4 is a bottom view of the embodiment illustrated in FIG. 1 showing the relationship of the various structural parts and in addition illustrates a means of adapting the invention for use with a cylindrical test specimen;

FIG. 5 is an isometric view of a flexure ring illustrating a measuring means attached thereto;

FIG. 6 is an electrical circuit schematic showing a means for measuring changes in distance between the two knife edges which means may be used with the flexure ring illustrated in FIG. 5;

FIG. 7 is an isometric view of another embodiment of the present invention illustrating the invention in operational relationship to a test specimen; and FIG. 8 is an electrical circuit schematic showing a means for measuring changes in distance between the two knife edges which means may be used with the embodiment illustrated in FIG. 7.

DESCRIPTION OF THE PREFERRED EMBODIMENTS

Figure 1:
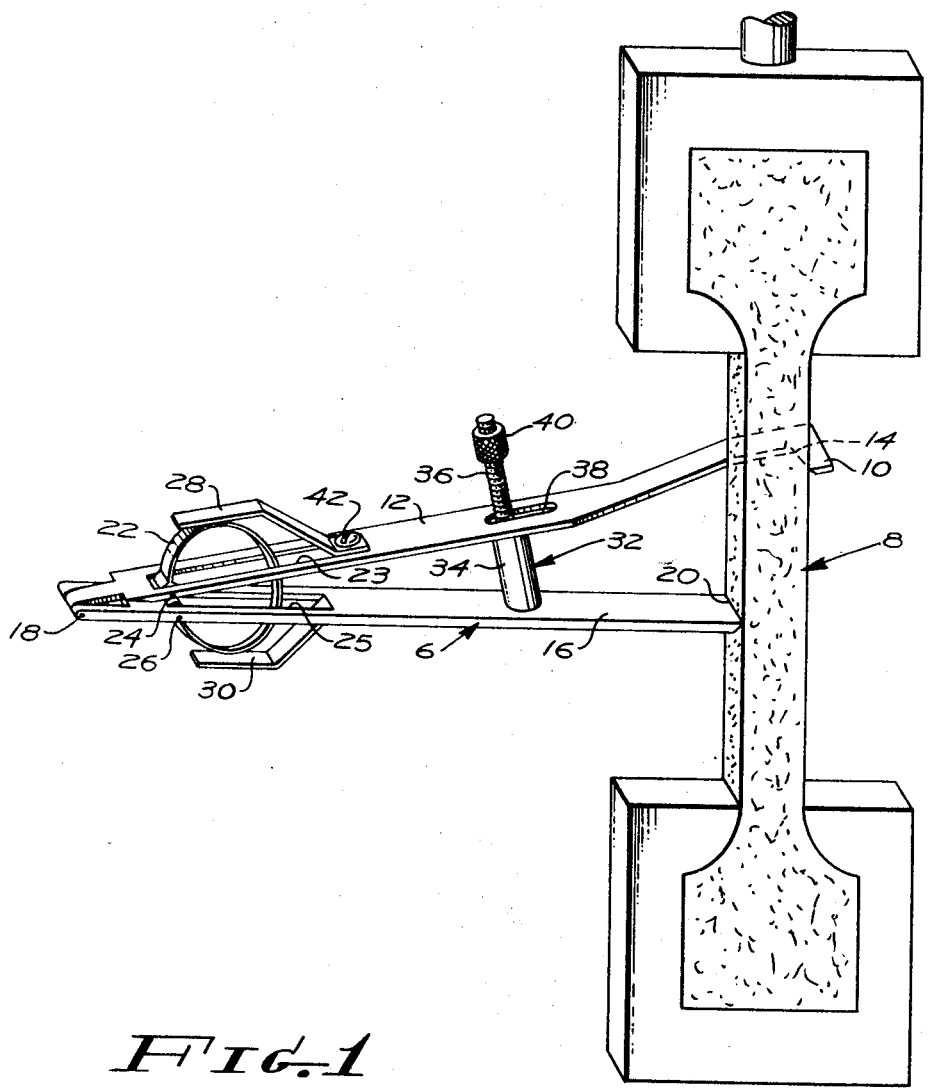
FIG. 1 is an isometric view of one embodiment of the present invention illustrating the invention is operational relationship to a test specimen.

Although the present invention has application on any extensible material, it has particular utility for strain testing of elastomers. By definition, strain is the change in length divided by the gage length. Therefore it is important that the test specimen not be distorted prior to commencement of testing. As the weight of the invention should not be sufficient to distort the test specimen, it is preferable that the structural parts be made of lightweight material wherever practical. In practice, the parts of the present invention were made of aluminum except for flexure parts, pins, and screws, in order to minimize weight as much as possible.

Reference is made to FIG. 1 which illustrates one embodiment of the present invention. An extensometer 6 having an upper arm 12 and a lower arm 16, rests against a test specimen 8. The offset hook end 10 of the upper arm 12 extends beyond and around the test specimen 8. An upper knife edge 14 located on the offset hook end 10 of the upper arm 12 is forced against the test specimen 8 by the weight of the extensometer 6. The lower arm 16 is pivotally connected to the upper arm 12 by a pivot pin 18. The lower arm 16 has a knife edge 20 across the end remote from the pivot pin 18. The lower knife edge 20 rests against the test specimen 8 on the surface adjacent to extensometer 6 and opposite to the surface upon which rests the upper knife edge 14. The weight of the extensometer 6 forces the lower knife edge 20 against the test specimen 8 and the lower knife edge 20 provides a fulcrum point around which the extensometer 6 pivots and thereby causing the weight of the extensometer 6 to pull the upper knife edge 14 against the test specimen 8.

The knife edges 14 and 20 provide an edge means for the extensometer 6 to engage the test specimen 8. Other means for the extensometer 6 to engage the test specimen 8 are readily apparent to those versed in the art; for example, serated edges or edges having a high coefficient of friction in relation to the test specimen 8 may be used.

In order to provide measuring means for measuring changes in distance between the knife edges 14 and 20, a flexure ring 22 interconnects the upper arm 12 and the lower arm 16. The flexure ring 22 extends through the upper arm 12 through an upper arm flexure ring slot 23. The flexure ring 22 is pivotally attached to the upper arm 12 by the flexure ring upper arm pivot pin 24. In a similar manner the flexure ring 22 extends through the lower arm 16 through a lower arm flexure ring slot 25. The flexure ring 22 is pivotally attached to the lower arm 16 by the flexure ring lower arm pivot pin 26. Semiconductor strain gages (not shown in this figure) are rigidly attached to the flexure ring 22 to establish a four arm Wheatstone bridge circuit for measuring changes in distance between the upper knife edge 14 and the lower knife edge 20. A more detailed discussion of this measuring means appears later in this specification.

During test, and other precautions being absent, the test specimen 8 may be sufficiently stretched to cause damage to the flexure ring 22. In order to prevent such damage there are precautions which may be taken. For example, an upper arm flexure ring guard 28 may be rigidly attached to the upper arm 12 by an upper arm screw 42 and a lower arm flexure ring guard 30 may be rigidly attached to the lower arm 16. As the upper arm 12 and the lower arm 16 are pulled apart, the flexure ring 22 will assume an elliptical shape. The ring guards 28 and 30 are so positioned that before the flexure ring 22 will sustain permanent damage, the elliptical shape causes the flexure ring 22 to come into contact with the ring guards 28 and 30. When the pre-set limitation condition is attained, any additional attempt to separate the knife edges 14 and 20 will cause slippage of the knife edges 14 and 20 on test specimen 8.

A feature of convenience as well as an additional precaution against damage is a limiting stop 32. The limiting stop 32 may be pivotally mounted onto the lower arm 16; however, it is recommended that limiting stop 32 be rigidly attached to lower arm 16 to prevent interference with the upper arm 12. The limiting stop body 34 is rigidly attached to the lower arm 16 such that the limiting stop body 34 is normal to the upper arm 20. The limiting stop body 34 may be screwed into the lower arm 16, attached to the lower arm 16 by a bolt or may be welded onto the lower arm 16. Extending beyond the limiting stop body 34 is a limiting stop reduced end 36 which in practice was a threaded end. The limiting stop reduced end 36 extends through the upper arm 12 through an upper arm limiting stop slot 38. Under no load conditions on test specimen 8, the upper arm 12 rests against the limiting stop body 34. A limiting flange 40 is adjustably mounted onto the limiting stop reduced end 36 and in practice was a nut screwed onto the threaded end. The limiting flange 40 is adjustable onto the limiting stop reduced end 36 so that limits may be placed upon the change in distance between the knife edges 14 and 20. As a matter of convenience, when the upper arm 12 is resting against the limiting stop body 34, the distance between knife edges 14 and 20 are known. The limiting stop 32 provides an additional safety factor. When the upper arm 12 comes into contact with the limiting flange 40, additional separation of the upper arm 12 and the lower arm 16 is restricted and continued force attempting to further separate the knife edges 14 and 20 will cause the knife edges 14 and 20 to slip on test specimen 8.

Turning now to FIGS. 2, 3, 4, 5 and 6, specific features of the present invention are more clearly illustrated. FIG. 2, a top view of the extensometer 6, shows the offset hook end 10 of the upper arm 12 is constructed so that the knife edges 14 and 20 are parallel to each other, are normal to and are centered across the longitudinal axes 11 of the upper and lower arms 12 and 16, respectively.

In FIG. 3, a side view of the extensometer 6, the limiting stop 32 is shown as being mounted on the lower arm 16 in a manner so that the limiting stop 32 is normal to the upper arm 12. Also, the lower flexure ring guard 30 is shown as being mounted to the lower arm 16 with a similar means as that used for mounting the upper flexure ring guard 28 to the upper arm 12. Measuring means for measuring changes in distance between the knife edges 14 and 20 is shown on flexure ring 22. Tension semi-conductor strain gages 52 and 52′ are bonded to the internal circumferential surface of the flexure ring 22 and compression semi-conductor strain gages 54 and 54′ are bonded to external circumferential surface of the flexure ring 22. The electrical circuit schematic for a measuring means is discussed later herein.

FIG. 4 is a bottom view of the extensometer 6. This view shows the means used in practice of mounting the lower flexure ring guard 30 to the lower arm 16 by lower arm screw 44. There is also shown the means used in practice of mounting the limiting stop 32 to the lower arm 16 by the limiting stop screw 46. In addition, there is illustrated a modification to the knife edges 14 and 20 to provide a convenient way of utilizing the extensometer 6 with a cylindrical test specimen (not shown). The knife edges 14 and 20 have triangular notches 21 and 21′ cut therein. The notches 21 and 21′ are centered across the longitudinal axes 11 and prevent the extensometer from sliding off of a cylindrical test specimen (not shown).

FIG. 5 is an isometric view of the flexure ring 22. The flexure ring 22 is a split ring having an upper pivot hub 48 at one end of the split ring and a lower pivot hub 50 at the other end of the split ring. Tension semiconductor strain gages 52 and 52′ are shown bonded onto the flexure ring 22. The tension semiconductor strain gages 52 and 52′ provide one side of a strain gage bridge 55, shown in FIG. 6, and compression strain gages 54 and 54′ shown in FIG. 3 provide the other side of the bridge 55. The strain gage bridge 55 when coupled with a power source and recorder, provides an accurate means for measuring changes in distance between upper knife edge 14 and lower knife edge 20, illustrated in other drawings.

FIG. 6 is an electrical schematic drawing of a measurement means arrangement. The semiconductor strain gages 52, 52′, 54 and 54′ constitute a well known strain gage (Wheatstone) bridge 55 that is within the existing stateof-the-art. A power source 56 coupled to the bridge 55 supplies a voltage across the bridge 55 in accordance with means well known to those versed in the art. In like manner, and in accordance with means well known to those versed in the art, the voltage across the bridge 55 and changes in the voltage are either measured or recorded by a measuring means well known in the art, or a recorder 57 coupled to the bridge 55. As the flexure ring 22, shown in other drawings, is flexed due to changes in length of the test specimen 8, shown in other drawings, the resistance within the bridge 55 varies and the voltage across the bridge 55 varies in direct proportion to the change in distance between the knife edges 14 and 20, also shown in other drawings.

Referring now to FIG. 7, there is illustrated another embodiment of the present invention. An extensometer 6' rests against a test specimen 8'. The offset hook and 10' of the upper arm 12' extends beyond and around the test specimen 8'. The upper knife edge 14' located on the offset hook end 10' of the upper arm 12' is forced against the test specimen 8' by the weight of the extensometer 6'. The weight of the extensometer 6' may be varied by a counterweight 58 attached to the upper arm 12' remote from the hook end 10'. A slider member 59 is connected onto the upper arm 12' between the offset hook end 10' and the counterweight 58. The slider member 59 is normal to the upper arm 12'. In practice, the slider member 59 was connected to the upper arm 12' by a nut 60 screwed upon a threaded end 61 of the slider member 59. The slider member 59 is a necessary part of a linear potentiometer 62. A lower member 64 having a knife edge 20' thereon is attached to the linear potentiometer 62 remote from the upper arm 12'. The knife edge 20' faces away from the linear potentiometer 62 so that the knife edge 20' rests against a surface of test specimen 8' which surface is opposite the one upon which the upper knife edge 14' rests. The weight of the extensometer 6' forces the lower knife edge 20' against the test specimen 8' and the lower knife edge 20' provides a fulcrum point around which the extensometer 6' pivots and thereby causing the weight of the extensometer 6' to pull the upper knife edge 14' against the test specimen 8'. The linear potentiometer 62, when coupled to a power source and recorder, provides a means for measuring changes in distance between upper knife edge 14' and lower knife edge 20'.

FIG. 8, to which reference is now made, is an electrical schematic of measuring means utilizing a linear potentiometer. A power source 56' coupled to the linear potentiometer 62 supplies a voltage across the potentiometer 62 in accordance with means well known to those versed in the art. In accordance with means well known to those versed in the art, the voltage across the potentiometer 62 and changes in the voltage are either measured or recorded by a measuring means or a recorder 57' electrically connected to the potentiometer 62. As the slider member 59 changes position due to changes in length of test specimen 8' shown in other drawings, the resistance within the potentiometer 62 varies and the voltage across the potentiometer 62 varies in direct proportion to the change in distance between the knife edges 14' and 20', also shown in other drawings.

At the initiation of tests, the test specimen 8 is placed in a testing machine (not shown) and test specimen 8 is under a no-load condition. The extensometer 6 is then positioned onto test specimen 8 as illustrated in FIGS. 1 and 7, at which time the reference gage distance between the upper knife edge 14 and the lower knife edge 20 may be readily ascertained. During test, a tension load is placed upon the test specimen 8, in a manner well known to those skilled in the art, causing elongation which pulls the upper knife edge 14 and the lower knife edge 20 further apart. The change in length of test specimen 8 provides important data for calculating modulus and strain.

To those versed in the art, other means of measuring changes in distance between the knife edges 14 and 20 becomes readily apparent. For example, optical techniques may be utilized as well as the use of linear potentiometers and strain gage bridges. Variations of the linear potentiometers may be the use of a linear variable differential transformer or a direct current differential transformer whichever is most suitable for available instrumentation or test requirements.

For purposes of operation, the limiting stop 32 has been designed so that in the closed position the extensometer 6 is at a zero strain position and the open position is adjustable. The limits can be conveniently set for 0 to 100% strain providing a very simple method for calibrating the recorder 57. Simply set the recorder 57 at 0 with the extensometer closed and span it to full scale open for 0 to 100% strain full scale. The knife edges 14 and 20 of the extensometer 6 exactly follows the elongation of the test specimen 8 as it is strained. The changes in position of the knife edges 14 and 20 are sensed by the measuring means and the voltage output which is proportional to the elongation of test specimen 8 is conveniently recorded as engineering strain. When using the linear potentiometer embodiment, calibration is accomplished in a similar manner as the potentiometer slide capabilities provide the limits within which the unit functions. Being very light, the extensometer 6 has no detectable effect on the response of the test specimen 8. The conduction of tests in abnormal temperature environments is limited only by the ability of the sensing instrumentation to function therein. The extensometer 6 works well at strain rates as high as 100 minutes$^{-1}$. Strains of 200% may be measured with an accuracy of $\pm.05\%$ or better during tensile creep or stress relaxation testing.

Though this extensometer 6 finds primary application as an elongation measuring apparatus for tension testing, it has equal application in measuring length reduction in compression testing. To measure reduction in length during compression testing, the extensometer 6 is placed onto the test specimen 8 with the knife edges 14 and 20 extended apart. During compression test, the changes in voltage across the measuring means is directly proportional to the changes in length of the test specimen 8.

There has accordingly been shown and described a useful and novel extensometer. Obviously many modifications and variations of the present invention are possible in light of the above teachings. It is therefore to be understood that within the scope of the appended claims, the invention may be practiced otherwise than as specifically described.

What is claimed is:

1. An extensometer for measuring changes in the length of a test specimen, said extensometer comprising:
  an elongated upper arm having two ends, each lying at the extremities thereof, one end of which has an integral offset hook with an edge means thereon adapted to engage said test specimen;
  a lower member having an edge means thereon adapted to engage said test specimen, said lower member edge means being disposed in opposed, parallel, staggered relation to said offset hook edge means;
  means connecting said upper arm and said lower member at a location remote from said edge means thereof for relative movement therebetween so that the distance defining the staggered positioning of said opposed edge means can be varied;
  means operably associated with said upper arm and said lower member for measuring the relative movement therebetween;
  said opposed edge means being adapted to be disposed on opposite sides of said test specimen and in contact therewith; and
  said opposed edge means of said upper arm and said lower member being movable relative to each other in response to strain forces being imparted to the test specimen so as to vary the distance defining the staggered positioning of said opposed edge means, whereby the measurement of the relative movement between said upper arm and said lower member is a measurement of the change in distance between said opposed edge means and a measurement of strain.

2. An extensometer for measuring changes in the length of test specimen, said extensometer comprising:

an elongated upper arm having two ends, each lying at the extremities thereof, one end of which has an integral offset hook with an edge means thereon facing the other end of said upper arm, said edge means adapted to engage said test specimen;

an elongated lower arm having two ends, one end being pivotally mounted to said other end of said upper arm remote from said offset hook, and a second end of said lower arm having an outwardly facing edge means adapted to engage said test specimen, said lower arm edge means being disposed in opposed, parallel, staggered relation to said offset hook edge means;

means operably associated with said upper arm and said lower arm for measuring variances in the distance defining the staggered positioning of said opposed edge means;

said opposed edge means being adapted to be disposed on opposite sides of said test specimen and in contact therewith; and said opposed edge means of said upper arm and said lower arm being movable relative to each other in response to strain forces being imparted to the test specimen so as to vary the distance defining the staggered positioning of said opposed edge means.

3. An extensometer as described in claim 2, wherein said edge means includes a knife edge.

4. An extensometer as described in claim 2, wherein said measuring means comprises an electrical bridge circuit including read-out means.

5. An extensometer as described in claim 2, with the following additional elements which comprise:

said upper arm having a limiting stop slot adjacent said offset hook;

an elongated limiting stop with a body portion and an extension thereof having a reduced cross-section, said body portion being rigidly mounted on said lower arm normal to said upper arm, said extension passing through said slot and beyond said upper arm; and a limiting flange adjustably mounted on said extension, said upper arm being intermediate said body and said flange.

6. An extensometer as described in claim 2, wherein said measuring means includes:

a linear potentiometer associated with said upper arm and said lower arm capable of being electrically connected to a power source; and a read-out means electrically connected to said potentiometer.

7. An extensometer as described in claim 6, wherein said read-out means includes a recording means for recording variances in voltage across said potentiometer.

8. An extensometer as described in claim 2, wherein said measuring means comprises:

said upper arm having a flexure ring slot adjacent said other end;

said lower arm having a flexure ring slot adjacent said one end;

a flexure ring having a first and a second end, said flexure ring extending through said upper arm slot and through said lower arm slot, said first end being pivotally mounted to said upper arm, said second end being pivotally mounted to said lower arm;

an electrical bridge circuit bonded to said flexure ring capable of being electrically connected to a power source; and a read-out means electrically connected to said bridge circuit for measuring variances in voltage across said circuit.

9. An extensometer as described in claim 8, and in addition:

an upper arm flexure ring guard rigidly mounted on said upper arm and extending spacially remote from and across said flexure ring; and a lower arm flexure ring guard rigidly mounted on said lower arm and extending spacially remote from and across said flexure ring.

10. An extensometer for measuring changes in the length of a test specimen, said extensometer comprising:

an elongated upper arm having two ends, each lying at the extremities thereof, one end of which has an integral offset hook with an edge means thereon facing the other end of said upper arm, said edge means adapted to engage said test specimen;

a linear potentiometer rigidly attached to said upper arm and normal thereto, capable of being electrically connected to a power source, said potentiometer being disposed below said upper arm and intermediate said two ends;

an edge means rigidly attached to said linear potentiometer remote from said upper arm, said potentiometer edge means adapted to engage said test specimen and being disposed in opposed, parallel, staggered relation to said offset hook edge means;

said opposed edge means being adapted to be disposed on opposite sides of said test specimen and in contact therewith;

said opposed edge means being movable relative to each other in response to strain forces being imparted to the test specimen so as to vary the distance defining the staggered positioning of said opposed edge means; and a read-out means electrically connected to said potentiometer for measuring changes in voltage across said potentiometer.

11. An extensometer as described in claim 10, wherein said edge means includes a sharp serrated edge.

References Cited

UNITED STATES PATENTS

| | | | |
|---|---|---|---|
| 1,531,111 | 3/1925 | Lewis | 33—147 |
| 2,744,181 | 5/1956 | Rea | 33—147 X |
| 2,941,298 | 6/1960 | Huyser | 33—148 |
| 3,319,338 | 5/1967 | De Nicola | 33—148 |

WILLIAM D. MARTIN, Jr., Primary Examiner

U.S. Cl. X.R.

73—88.5